US010710464B2

(12) United States Patent
Uddin et al.

(10) Patent No.: US 10,710,464 B2
(45) Date of Patent: Jul. 14, 2020

(54) ELECTRICAL DIFFERENTIAL MOTOR ASSEMBLY WITH TORQUE VECTORING

(71) Applicant: Schaeffler Technologies AG & Co. KG, Herzogenaurach (DE)

(72) Inventors: Md. Wasi Uddin, Akron, OH (US); Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/136,878

(22) Filed: Sep. 20, 2018

(65) Prior Publication Data

US 2020/0094684 A1    Mar. 26, 2020

(51) Int. Cl.
| | |
|---|---|
| *B60L 50/51* | (2019.01) |
| *F16H 48/36* | (2012.01) |
| *F16H 48/08* | (2006.01) |
| *H02K 7/116* | (2006.01) |
| *H02K 7/00* | (2006.01) |
| *H02K 16/02* | (2006.01) |
| *H02K 17/02* | (2006.01) |

(52) U.S. Cl.
CPC ............. *B60L 50/51* (2019.02); *F16H 48/08* (2013.01); *F16H 48/36* (2013.01); *H02K 7/006* (2013.01); *H02K 7/116* (2013.01); *H02K 16/025* (2013.01); *H02K 17/02* (2013.01); *B60L 2240/421* (2013.01); *B60L 2240/423* (2013.01); *B60L 2240/461* (2013.01); *B60Y 2400/70* (2013.01)

(58) Field of Classification Search
CPC ....................................................... B60L 50/51

USPC ................................................... 318/727, 34
See application file for complete search history.

(56) References Cited

U.S. PATENT DOCUMENTS

| | | | |
|---|---|---|---|
| 5,212,435 A * | 5/1993 | Dutro ..................... | H02K 17/08 318/785 |
| 6,914,410 B2 * | 7/2005 | Morgante .............. | H02P 27/048 318/14 |

(Continued)

OTHER PUBLICATIONS

Malcolm Burnwell, "Copper-rotor induction-motor: Strong alternative to rare earth motors for EV traction," SAE 2012 Powertrain Electric Motors Symposium for Electric and Hybrid Vehicles Detroit—Apr. 23, 2012 (accessible on Jul. 2, 2018 at http://www.coppermotor.com/wp-content/uploads/2012/04/Copper-Rotor-induction-Motor-Copper-Alliance-Malcolm-Burwell-SAE-eMotors-23-April-2012-v1.0.pdf.

*Primary Examiner* — David Luo
(74) *Attorney, Agent, or Firm* — Davidson, Davidson & Kappel, LLC (57) ABSTRACT

A motor vehicle drive train assembly includes an axial flux induction motor including a stator, a first rotor and a second rotor. The stator, the first rotor and the second rotor are concentric with a motor center axis. The first rotor is axially spaced from a first axial side of the stator by a first air gap and the second rotor is axially spaced from a second axial side of the stator by a second air gap. The axial flux induction motor is configured such that the first rotor is rotatable about the motor center axis by the stator at a first rotational speed to drive a first drive shaft non-rotatably connected to the first rotor while the second rotor is rotatable about the motor center axis by the stator at a second rotational speed that is greater than the first rotational speed to drive a second drive shaft non-rotatably connected to the second rotor.

18 Claims, 6 Drawing Sheets

(56) References Cited

U.S. PATENT DOCUMENTS 10,252,624 B2 * 4/2019 Kelleter ................ B60L 15/007
2017/0282725 A1 10/2017 Kelleter et al.

* cited by examiner

ELECTRICAL DIFFERENTIAL MOTOR ASSEMBLY WITH TORQUE VECTORING

The present disclosure relates generally to electric motors and more specifically an electrical motor in a differential motor assembly of an automotive drive train.

BACKGROUND

Most vehicles with rear or front wheel drive have a differential. The differential balances the torque in the two axles. If an e motor is attached to the axle of the vehicle the e motor also needs to be connected with a differential. The differential is connected to the e motor output and axles of the drive train. The e motor provides torque input to the differential and the differential splits the torque into two axles. The e motor rotor may or may not be concentric, but the differential is used to split the e motor torque into two axles, each connected to a respective wheel.

SUMMARY OF THE INVENTION

A motor vehicle drive train assembly includes an axial flux induction motor including a stator, a first rotor and a second rotor. The stator, the first rotor and the second rotor are concentric with a motor center axis. The first rotor is axially spaced from a first axial side of the stator by a first air gap and the second rotor is axially spaced from a second axial side of the stator by a second air gap. The axial flux induction motor is configured such that the first rotor is rotatable about the motor center axis by the stator at a first rotational speed to drive a first drive shaft non-rotatably connected to the first rotor while the second rotor is rotatable about the motor center axis by the stator at a second rotational speed that is greater than the first rotational speed to drive a second drive shaft non-rotatably connected to the second rotor.

In embodiments of the motor vehicle drive train assembly, each of the first and second rotors includes an axially outer section facing axially away from the stator and an axially inner section facing axially toward the stator. The axially inner section may include a plurality of radially extending spokes. The axially inner section may include a plurality of segments circumferentially spaced apart from each other by the spokes. The segments may be formed of a different material than the spokes. The axially inner section may include an inner ring and an outer ring. The segments may extend radially outward from the inner ring to the outer ring. The spokes, the inner ring and the outer ring may be formed of a same material, which may be copper or aluminum. The axially outer section may be an annular plate that is a same material as the segments, which may be steel. The motor vehicle drive train assembly may include the first drive shaft non-rotatably connected directly to the first rotor and the second drive shaft non-rotatably connected directly to the second rotor. The axial flux induction motor may be configured for operation with the motor center axis coincident with a center axis of the first and second drive shafts. The axial flux induction motor may be configured for operation with the motor center axis perpendicular with a center axis of the first and second drive shafts. The motor vehicle drive train assembly may include a first gear fixed to the first rotor and a second gear fixed to the second rotor. The motor vehicle drive train assembly may include a first vertically aligned bevel gear intermeshing with the first gear and a second vertically aligned bevel gear intermeshing with the second gear. The motor vehicle drive train assembly may include the first drive shaft, the second drive shaft, a first horizontally aligned bevel gear intermeshing with the first vertically aligned bevel gear and a second horizontally aligned bevel gear intermeshing with the second vertically aligned bevel gear. The first horizontally aligned bevel gear may be configured for driving the first drive shaft and the second horizontally aligned bevel gear may be configured for driving the second drive shaft. The first horizontally aligned bevel gear may be fixed directly to the first drive shaft and the second horizontally aligned bevel gear may be fixed directly to the second drive shaft.

A method of forming a motor vehicle drive train assembly includes providing an axial flux induction motor including a stator, a first rotor and a second rotor. The stator, the first rotor and the second rotor may be concentric with a motor center axis. The first rotor may be axially spaced from a first axial side of the stator by a first air gap and the second rotor may be axially spaced from a second axial side of the stator by a second air gap. The axial flux induction motor may be configured such that the first rotor is rotatable about the motor center axis by the stator at a first rotational speed to drive a first drive shaft non-rotatably connected to the first rotor while the second rotor is rotatable about the motor center axis by the stator at a second rotational speed that is greater than the first rotational speed to drive a second drive shaft non-rotatably connected to the second rotor.

Embodiments of the method may further comprise non-rotatably connecting the first drive shaft directly to the first rotor and non-rotatably connecting the second drive shaft directly to the second rotor or connecting the first drive shaft non-rotatably to the first rotor via at least one first bevel gear and non-rotatably connecting the second drive shaft to the second rotor via at least one second bevel gear.

BRIEF DESCRIPTION OF THE DRAWINGS

The present disclosure is described below by reference to the following drawings, in which.

DETAILED DESCRIPTION

The present disclosure provides an electrical differential motor assembly including an axial flux induction motor, which has the ability to operate at a different speed than the input excitation. The axial flux induction motor has two induction rotors at two axial ends of the motor and one stator sandwiched between the rotors with small air gaps.

Figure 1:
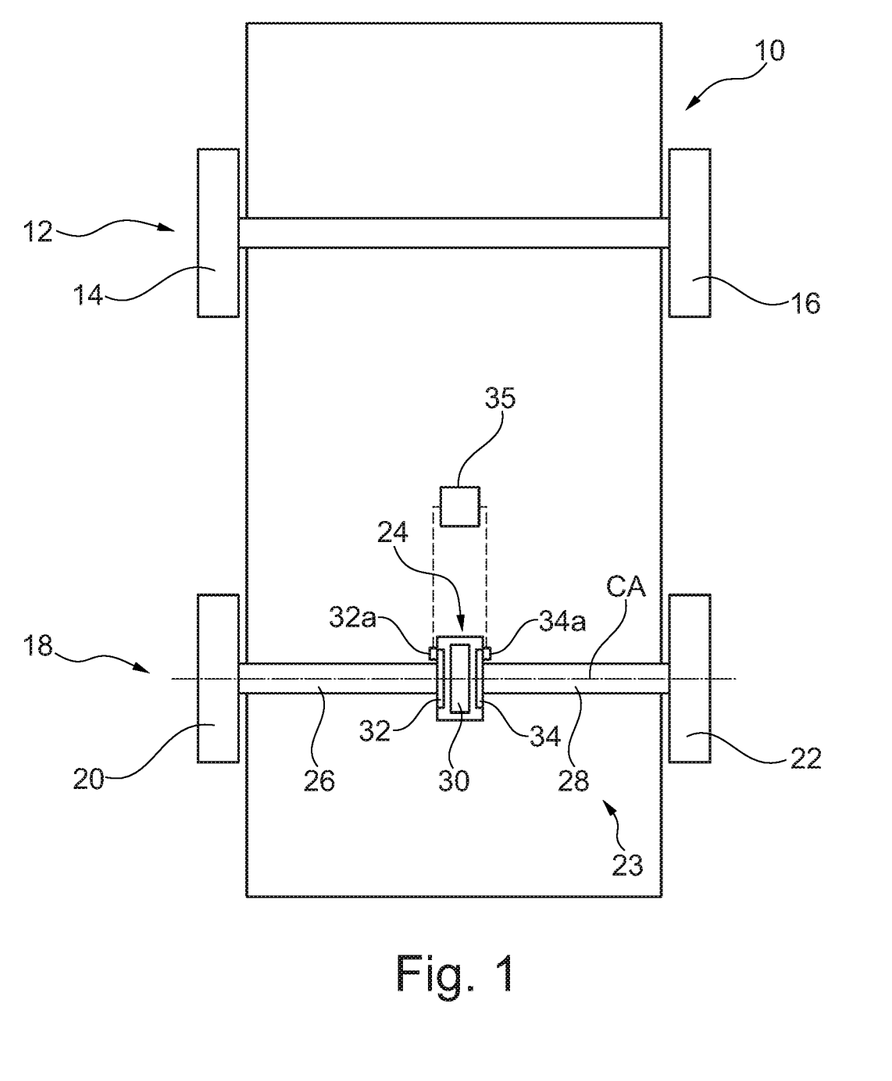
FIG. 1 shows an embodiment of a hybrid motor vehicle drive train in accordance with an embodiment of the present disclosure.

FIG. 1 shows a front wheel drive motor vehicle drive train 10 in accordance with an embodiment of the present disclosure. Drive train 10 includes a first axle 12 coupling together a first pair of wheels 14, 16 and a second axle 18 coupling together a second pair of wheels 20, 22. Second axle 18 is the rear axle and is driven by an axial flux induction motor 24 about a center axis CA. More specifically, second axle 18 includes a first drive shaft 26 for driving wheel 20 and a second drive shaft 28 for driving wheel 22. Motor 24 and drive shafts 26, 28 together form a motor vehicle driving train assembly 23. Motor 24, which is shown schematically in FIG. 1, allows drive shafts 26, 28 and the respective connected wheels 20, 22 to rotate at different speeds. Motor 24 includes a stator 30, a first rotor 32 drivingly fixed to first drive shaft 26 and a second rotor 34 drivingly fixed to second drive shaft 28. Motor 24 may be the sole drive source of drive train 10, or may be used with one or more further main drive sources. For example, an electric motor, an internal combustion engine, or a combination of an electric motor and an internal combustion engine (hybrid system) may be provided for driving front axle 12, with motor 24 being used as a supplemental drive source for driving rear axle 18 and acting as a differential.

The two induction rotors 32, 34 of axial flux induction motor 24 are rotatable via stator 30 about a motor center axis, which in this embodiment is center axis CA, at different speeds. In other words, axial flux induction motor 24 is configured such that rotor 32 is rotatable by stator 30 about center axis CA at a first rotational speed while rotor 34 is rotatable by stator 30 about center axis CA at a second rotational speed that is different than the first rotational speed. If one of the wheels 20, 22 gets slowed down in a curve, the excitation frequency applied to the stator 30 is changed in such a way that higher speed wheel is supplied with a first torque that is greater than a second torque supplied to the lower speed wheel. When the two vehicle wheels 20, 22 are rotating at the same speed, the induction motor stator 30 is controlled to operate at 95% to 100% of breakdown torque, which is the maximum torque which the induction motor 24 is capable of producing. When the speed of one of the two inductors rotors 32, 34 is greater than the speed of the other of the two rotors 32, 34, the rotor with the greater speed operates at a maximum torque and the rotor with the lessor speed operates at torque less than the maximum torque. In other words, if there is a speed difference between wheels 20, 22, the excitation of stator 30 is controlled to rotate rotors 32, 34 keep the higher speed wheel in a maximum torque point, while the lesser speed wheel moves into a lower speed and a lower torque.

Each of rotors 32, 34 is provided with a respective position or speed sensor 32a, 34a to sense a rotational speed difference between rotors 32, 34. When there is a curve, one of the wheels 20, 22 rotates faster than the other, and accordingly one of the rotors 32, 34 rotates faster than the other. Upon receiving measurements of the speed of both of the rotors 32, 34 from sensors 32a, 34a, an inverter 35 changes the excitation frequency such that the higher speed rotor is running at 95% to 100% of breakdown torque. Below the speed of breakdown torque, the induction motor 24 produces less torque. When a speed difference exists between rotors 32, 34, one of the rotors run at 95% to 100% of breakdown torque, and the other rotor naturally goes into a torque less than the 95% to 100% of breakdown torque. In other words, when wheels 20, 22 rotate at different speeds than each other, torque vectoring occurs such that there is a torque difference occurring between two rotors 32, 34 and the higher speed rotor gets more torque than the lower speed rotor.

Figure 2:
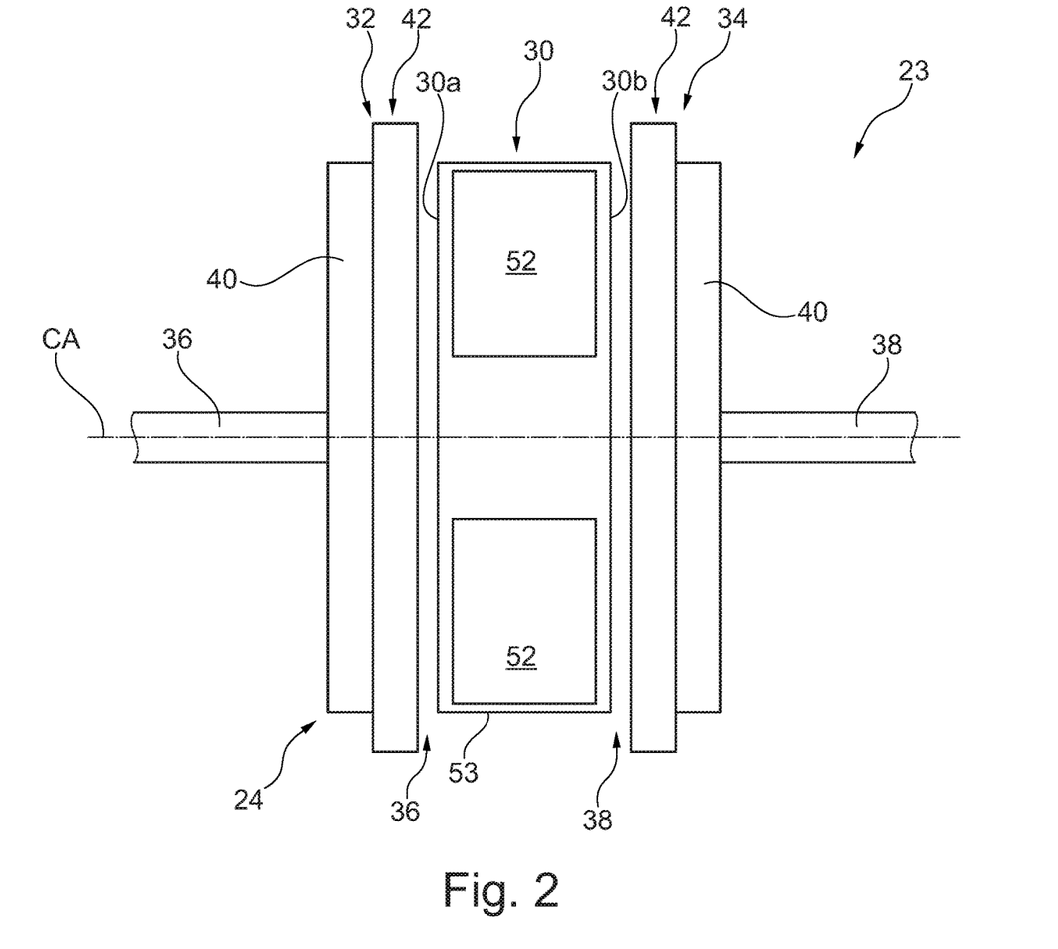
FIG. 2 shows a portion of a drive train assembly of the hybrid motor vehicle drive train in greater detail than in FIG. 1.

FIG. 2 shows a portion of drive train assembly 23 in greater detail than in FIG. 1. Rotors 32, 34 are rotatable about center axis CA with stator 30 being sandwiched axially between rotors 32, 34. Stator 30 includes a first axially facing surface 30a facing rotor 32 and a second axially facing surface 30b facing rotor 34. Stator 30 includes windings 52 in a housing 53. A first airgap 36 separates rotor 32 axially from first axially facing surface 30a of stator 30 and a second airgap 38 separates rotor 34 from second axially facing surface 30b of stator 30. Stator 30 is in the form of a disc centered on center axis CA and rotors 32, 34 are in the form of discs centered on center axis CA. Stator 30 is axially thicker than either of rotors 32, 34 and rotors 32, 34 are of identical construction. In the embodiment shown in FIG. 2, rotor 32 is directly nonrotatably fixed to drive shaft 26 and second rotor 34 is directly nonrotatably fixed to drive shaft 28. Rotors 32, 34 may include teeth on the inner circumference thereof configured for meshing with teeth extending radially outward on the ends of drive shafts 28, 30. Each rotor 32, 34 includes an axially outer section 40 for facing away from stator 30 and an axially inner section 42 for facing toward stator 30.

Figure 3A:
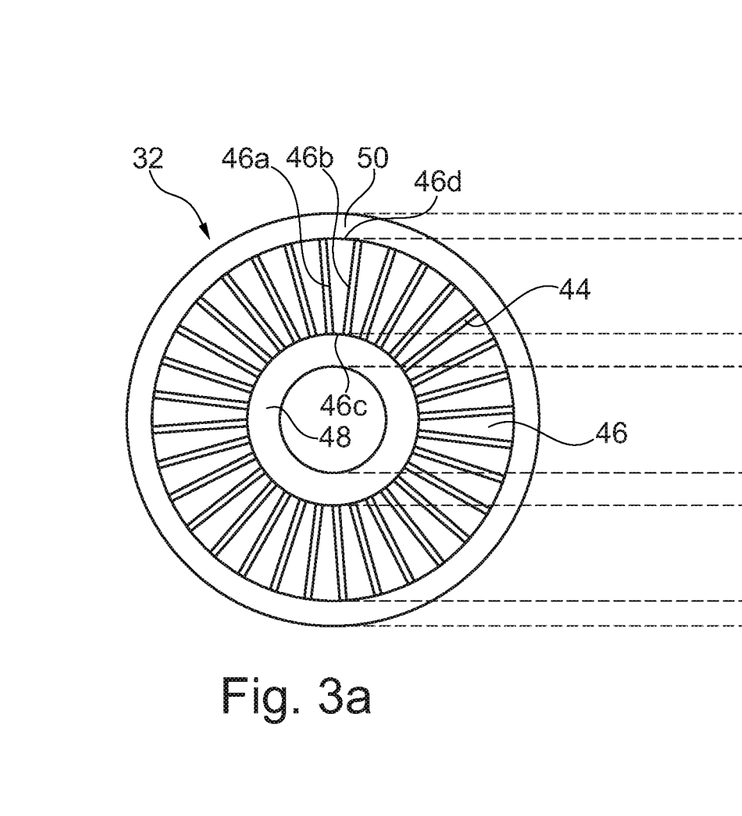
FIG. 3a shows an axial plan view of a rotor of an axial flux induction motor of the drive train assembly and FIG. 3b shows a side view of the rotor.
Figure 3B:
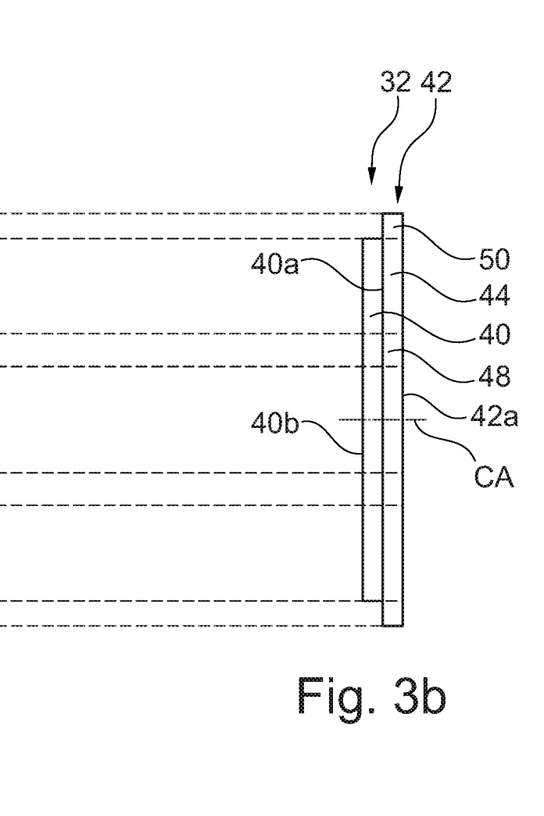

FIG. 3a shows an axial plan view of rotor 32 and FIG. 3b shows a side view of rotor 32. Axially outer section 40 is in the form of a plate 40, which is in the form of an annular disc and includes a first axially facing surface 40a configured for facing away from stator 30 and a second axially facing surface 40b configured for facing toward stator 30. First axially facing surface 40a is flat and completely uncovered, while second axially facing surface 40b is covered by axially inner section 42. More specifically, axially inner section 42 includes a plurality of spokes 44, a plurality of segments 46, an inner ring 48 and an outer ring 50. Spokes 44 are fixed to second axially facing surface 40b of section 40. Spokes 44 are circumferentially spaced from each other and extend radially outward from inner ring 48 to outer ring 50. Segments 46 are circumferentially spaced apart from each other by spokes 44, and from the plan view in FIG. 3a.

Each segment 46 has two radially extending straight edges 46a, 46b that extend radially outward from opposite ends of a curved inner edge 46c, which forms an inner circumference of the respective segment 46, to join opposite ends of a curved outer edge 46d, which forms an outer circumference of the respective segment 46. Airgap 36 (FIG. 2) is delimited axially between an axially inner surface 42a of axially inner section 42 and first axially facing surface 30a of stator 30 (FIG. 2). Axially inner surface 42a is formed by surfaces of spokes 44, segments 46, inner ring 48 and outer ring 50 extending in a same radially extending plane that is perpendicular to center axis CA.

In one preferred embodiment, axially outer section 40 and segments 46 are formed of steel, with axially outer section 40 being formed as a single piece with segments 46. Spokes 44 and rings 48, 50 may be formed of aluminum or copper, with spokes 44 electrically connecting inner ring 48 to outer ring 50.

Specifically, spokes 44 may be formed by machining or coining circumferentially spaced radially extending grooves into an annular plate, with the grooves extending from the inner circumference to the outer circumference of the annular plate and being separated by segments 46. Next, spokes 44 may be formed by a brazing process that includes filling the radially extending grooves with copper paste and heating the assembly formed of section 40, segments 46 and the copper paste in a brazing furnace. During the heating process, the copper solidifies into a 99% pure copper deposit and it bonds to the rotor steel. Inner ring 48 and outer ring 50 are added after the formation of spokes 44. The resulting rotor has a high stability under rotational speed and a high conductivity as a result of using copper as a conductor. In an alternative embodiment, rotors 32, 34 can be manufactured via a die cast process.

Figure 4A:
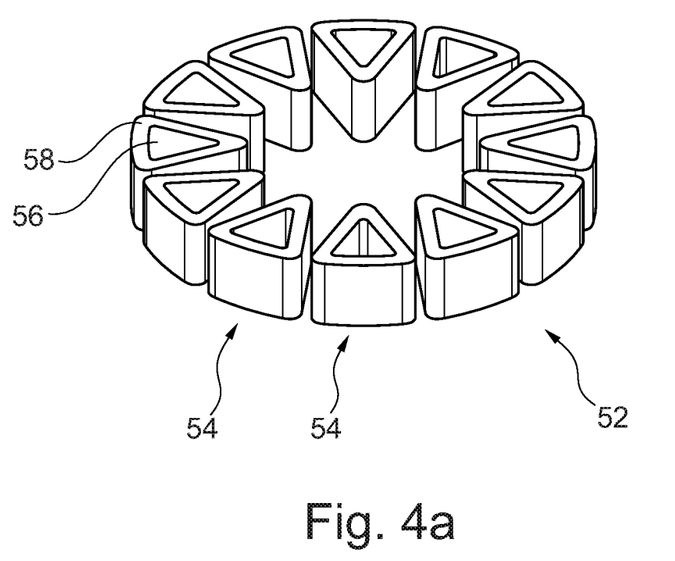
FIGS. 4a shows a perspective view of windings of a stator of the axial flux induction motor and FIG. 4b shows an axial plan view the windings.
Figure 4B:
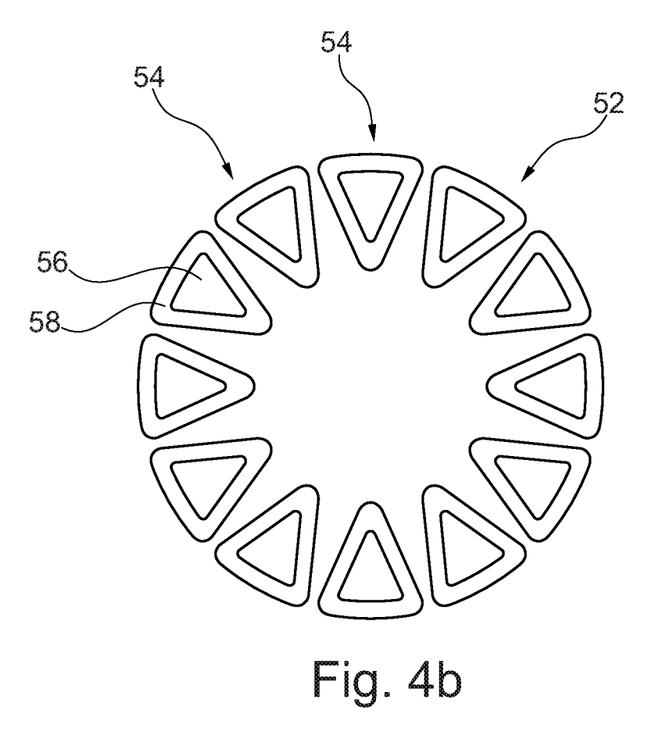
Figure 5:
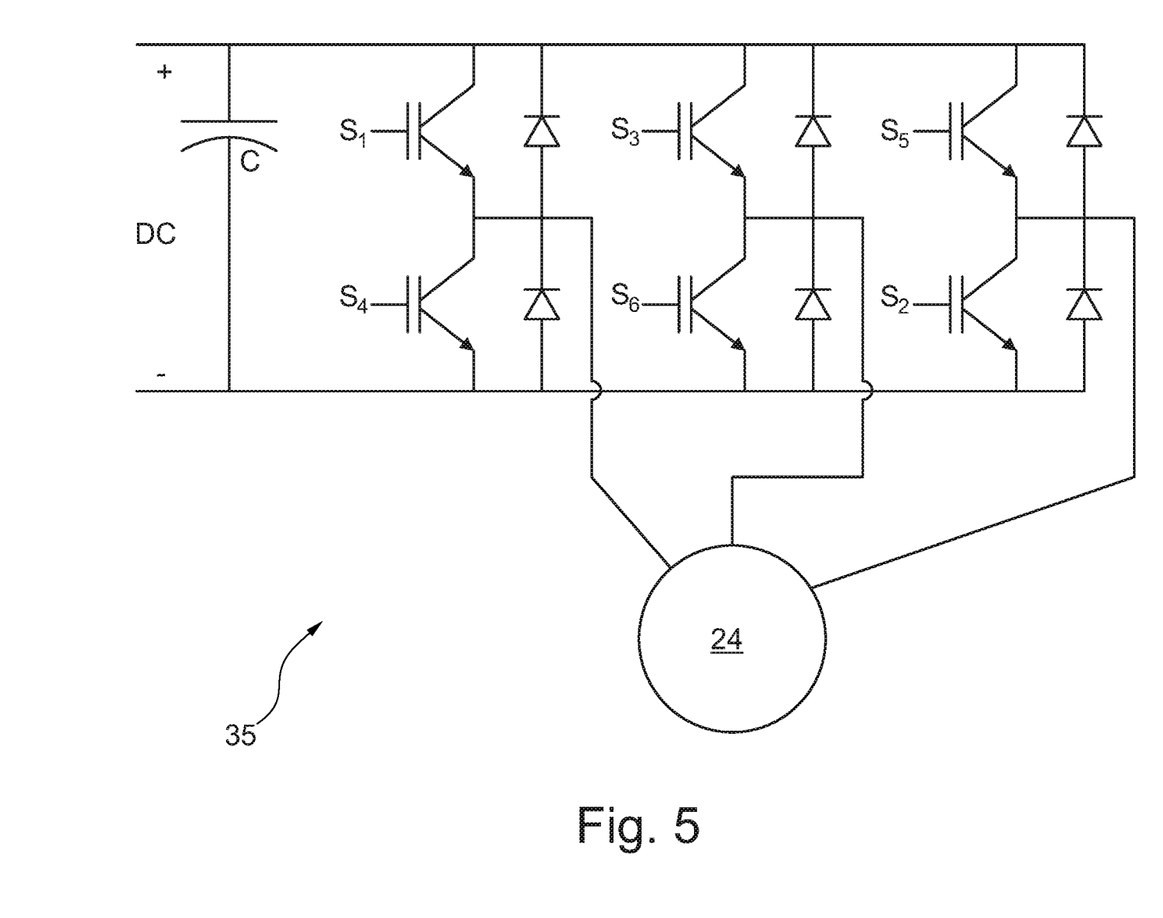
FIG. 5 shows an inverter of the drive train assembly.

FIG. 4a shows a perspective view of windings 52 of stator 30 and FIG. 4b shows an axial plan view windings 52. Windings 52 form a plurality of stator poles 54 that are circumferentially spaced from each other. Each stator pole 54 includes a core 56, which may be a piece of steel, wrapped by wires 58, which may be copper. The stator may include a liquid cooling jacket wrapped around it. The input excitation is sent to the stator from a DC battery through inverter 35, which is shown in FIG. 5. Inverter 35 is comprised of six switches $S_1$ to $S_6$. The six switches $S_1$ to $S_6$ alternately turn on-off and produce a voltage input to the induction motor 24. Depending on the duty cycle of the switch turn on-off, the voltage input to the induction motor 24 is controlled. Inverter 35 is configured for modulating the voltage and the frequency of the excitation voltage applied to stator 30. The excitation frequency determines the synchronous speed of the induction motor stator 30.

Figure 6:
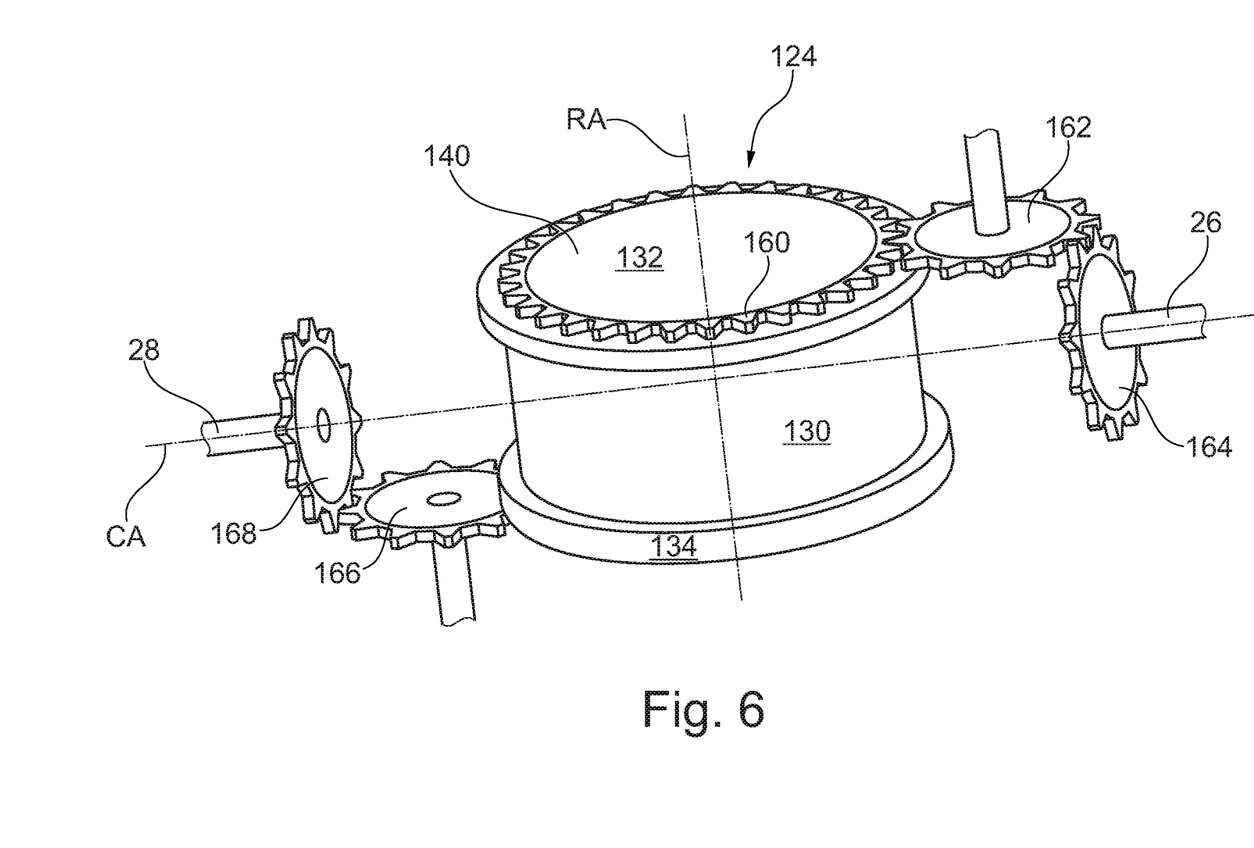
FIG. 6 shows an axial flux induction motor in accordance with another embodiment.

FIG. 6 shows an axial flux induction motor 124 in accordance with another embodiment. In contrast to the embodiment of FIG. 2, where the rotors 32, 34 and stator 30 are concentric with center axis CA, motor 124 has a perpendicular architecture and includes a stator 130 and rotors 132, 134 that are concentric with and rotatable about a motor center axis RA that extends perpendicular to center axis CA (FIG. 1) and the ground. Stator 130 is configured in the same manner as stator 30 and rotors 132, 134 are configured in substantially the same manner as rotors 32, 34, with the exception being that rotors 132, 134 each include a ring gear fixed thereto. As shown in FIG. 6, rotor 132 includes an outer axial section 140 that is formed in the same manner as outer axial section 40, except that section 140 is provided with teeth 160 on the outer circumference thereof to form the ring gear. A vertically aligned bevel gear 162 is provided that drivingly intermeshes with teeth 160 to receive torque from rotor 132 and drive a horizontally aligned bevel gear 164 this is non-rotatably fixed to first drive shaft 26.

In the same manner as rotor 132, rotor 134 also includes an outer axial section 140 that is provided with teeth on the outer circumference thereof. A vertically aligned bevel gear 166 is provided that drivingly intermeshes with the teeth on rotor 134 to receive torque from rotor 134 and drive a horizontally aligned bevel gear 168 this is non-rotatably fixed to second drive shaft 28. A benefit of the perpendicular architecture is the rotor and stator size can be varied according to the vehicle requirement.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
RA rotation axis
10 motor vehicle drive train+
12 first axle
14 front wheel
16 front wheel
18 second axle
20 rear wheel
22 rear wheel
23 motor vehicle driving train assembly
24 motor
26 first drive shaft
28 second drive shaft
30 stator
30a first axially facing surface
30b second axially facing surface
32 first rotor
34 second rotor
36 first airgap
38 second airgap
40 axially outer section
40a first axially facing surface
40b second axially facing surface
42 axially inner section
42a axially inner surface
44 spokes
46 segments
48 inner ring
50 outer ring
52 stator windings
53 stator housing
54 stator poles
56 core
58 wires
124 axial flux induction motor
130 stator
132 first rotor
134 second rotor
140 outer axial section
160 teeth
162 vertically aligned bevel gear
164 horizontally aligned bevel gear
166 vertically aligned bevel gear
168 horizontally aligned bevel gear

What is claimed is:

1. A motor vehicle drive train assembly comprising:
an axial flux induction motor including a stator, a first rotor and a second rotor, the stator, the first rotor and the second rotor being concentric with a motor center axis, the stator being axially between the first rotor and the second rotor and including a first axial side facing the first rotor and a second axial side opposite the first axial side facing the second rotor, the first rotor being axially spaced from the first axial side of the stator by a first air gap, the second rotor being axially spaced from the second axial side of the stator by a second air gap, the axial flux induction motor being configured such that the first rotor is rotatable about the motor center axis by the stator at a first rotational speed to drive a first drive shaft non-rotatably connected to the first rotor while the second rotor is rotatable about the motor center axis by the stator at a second rotational speed that is greater than the first rotational speed to drive a second drive shaft non-rotatably connected to the second rotor.

2. The motor vehicle drive train assembly as recited in claim 1 wherein each of the first and second rotors includes an axially outer section facing axially away from the stator and an axially inner section facing axially toward the stator, each of the axially inner sections including a plurality of radially extending spokes.

3. The motor vehicle drive train assembly as recited in claim 2 wherein each of the axially inner sections includes a plurality of segments circumferentially spaced apart from each other by the spokes, the segments being formed of a different material than the spokes.

4. The motor vehicle drive train assembly as recited in claim 3 wherein each of the axially inner sections includes an inner ring and an outer ring, the segments extending radially outward from the inner ring to the outer ring.

5. The motor vehicle drive train assembly as recited in claim 4 wherein the spokes, the inner ring and the outer ring are formed of a same material.

6. The method vehicle drive train assembly as recited in claim 5 wherein the same material is copper or aluminum.

7. The motor vehicle drive train assembly as recited in claim 4 wherein the axially outer section is an annular plate that is a same material as the segments.

8. The motor vehicle drive train assembly as recited in claim 7 wherein the same material is steel.

9. The motor vehicle drive train assembly as recited in claim 1 further comprising the first drive shaft non-rotatably connected directly to the first rotor and the second drive shaft non-rotatably connected directly to the second rotor.

10. The motor vehicle drive train assembly as recited in claim 1 wherein the axial flux induction motor is configured for operation with the motor center axis coincident with a center axis of the first and second drive shafts.

11. The motor vehicle drive train assembly as recited in claim 1 wherein the axial flux induction motor is configured for operation with the motor center axis perpendicular with a center axis of the first and second drive shafts.

12. The motor vehicle drive train assembly as recited in claim 11 further comprising a first gear fixed to the first rotor and a second gear fixed to the second rotor.

13. The motor vehicle drive train assembly as recited in claim 12 further comprising a first vertically aligned bevel gear intermeshing with the first gear and a second vertically aligned bevel gear intermeshing with the second gear.

14. The motor vehicle drive train assembly as recited in claim 13 further comprising the first drive shaft, the second drive shaft, a first horizontally aligned bevel gear intermeshing with the first vertically aligned bevel gear and a second horizontally aligned bevel gear intermeshing with the second vertically aligned bevel gear, the first horizontally aligned bevel gear arranged and configured for driving the first drive shaft, the second horizontally aligned bevel gear arranged and configured for driving the second drive shaft.

15. The motor vehicle drive train assembly as recited in claim 14 wherein the first horizontally aligned bevel gear is fixed directly to the first drive shaft and the second horizontally aligned bevel gear is fixed directly to the second drive shaft.

16. A method of forming a motor vehicle drive train assembly comprising:
providing an axial flux induction motor including a stator, a first rotor and a second rotor, the stator, the first rotor and the second rotor being concentric with a motor center axis, the stator being axially between the first rotor and the second rotor and including a first axial side facing the first rotor and a second axial side opposite the first axial side facing the second rotor, the first rotor being axially spaced from the first axial side of the stator by a first air gap, the second rotor being axially spaced from the second axial side of the stator by a second air gap, the axial flux induction motor being configured such that the first rotor is rotatable about the motor center axis by the stator at a first rotational speed to drive a first drive shaft non-rotatably connected to the first rotor while the second rotor is rotatable about the motor center axis by the stator at a second rotational speed that is greater than the first rotational speed to drive a second drive shaft non-rotatably connected to the second rotor.

17. The method as recited in claim 16 further comprising non-rotatably connecting the first drive shaft directly to the first rotor and non-rotatably connecting the second drive shaft directly to the second rotor.

18. The method as recited in claim 16 further comprising connecting the first drive shaft non-rotatably to the first rotor via at least one first bevel gear and non-rotatably connecting the second drive shaft to the second rotor via at least one second bevel gear.

* * * * *